United States Patent [19]

Symons

[11] Patent Number: 5,601,919

[45] Date of Patent: Feb. 11, 1997

[54] BUILDING COMPONENT

[75] Inventor: Michael W. Symons, Pretoria, South Africa

[73] Assignee: Tower Technologies (Proprietary) Limited, Transvall, South Africa

[21] Appl. No.: 130,174

[22] Filed: Oct. 1, 1993

[30] Foreign Application Priority Data

Oct. 1, 1992 [ZA] South Africa ............................ 92/7558

[51] Int. Cl.$^6$ ...................................................... D02G 3/00
[52] U.S. Cl. ........................ 428/375; 428/116; 428/317.7; 52/309.9; 52/304.3; 52/304.17
[58] Field of Search ................................ 428/375, 317.7, 428/116, 286, 287; 52/309.9, 806, 404, 785, 790, 799, 808, 809; 524/44; 536/96; 521/161, 162, 109, 106; 260/37, 77.5

[56] References Cited

U.S. PATENT DOCUMENTS

| | | | |
|---|---|---|---|
| 3,965,051 | 6/1976 | Markusch et al. | 260/2.5 |
| 4,105,594 | 8/1978 | Dieterich et al. | 521/100 |
| 4,146,509 | 3/1979 | Markusch et al. | 521/115 |
| 4,695,501 | 9/1987 | Robinson | 428/159 |
| 4,939,192 | 7/1990 | t'Sas | 524/44 |
| 5,309,690 | 5/1994 | Symons | 52/309.9 |

*Primary Examiner*—Merrick Dixon
*Attorney, Agent, or Firm*—Cushman Darby & Cushman IP Group Pillsbury Madison & Sutro LLP

[57] ABSTRACT

A building component includes a core formed from one or more sheets or elements of a natural fibre material, each sheet or element having been impregnated with a liquid composition including a thermosetting resin, an extending liquid for the thermosetting resin and a catalyst for the thermosetting resin, the thermosetting resin having been polymerized, and an encapsulating layer, from 1 mm to 20 mm thick, encapsulating the core and formed from a composition including from 10% to 80% inclusive by weight of the composition of a hydraulic binder, from 6% to 60% inclusive by weight of the hydraulic binder of a water soluble, dispersible or miscible polymer, and water in an amount sufficient to rehydrate the hydraulic binder, the composition having hardened to form the encapsulating layer.

14 Claims, No Drawings

BUILDING COMPONENT

BACKGROUND OF THE INVENTION

This invention relates to a building component comprising a lightweight core encapsulated in a suitable encapsulating composition.

Many types of building components are known. However, there is always a need for a new type of building component which has various desirable characteristics such as a high strength to weight ratio, a good impact resistance, non-flammability, water impermeability, and which may readily be connected to similar building components, and easily manufactured.

SUMMARY OF THE INVENTION

According to a first aspect of the invention there is provided a building component which comprises a core formed from one or more sheets or elements of a natural fibre material, each sheet or element having been impregnated with a liquid composition comprising a thermosetting resin, an extending liquid for the thermosetting resin and a catalyst for the thermosetting resin, the thermosetting resin having been polymerized, and an encapsulating layer encapsulating the core and formed from a composition comprising from 10% to 80% inclusive by weight of the composition of a hydraulic binder, from 6% to 60% inclusive by weight of the hydraulic binder of a water soluble, dispersible or miscible polymer, and water in an amount sufficient to rehydrate the hydraulic binder, the composition having hardened to form the encapsulating layer.

According to a second aspect of the invention there is provided a method of making a building component as described above which includes the steps of:

(i) forming the core from one or more sheets or elements of a natural fibre material, each sheet or element having been impregnated with a liquid composition comprising a thermosetting resin, an extending liquid for the thermosetting resin and a catalyst for the thermosetting resin, the thermosetting resin having been polymerized;

(ii) forming a composition from 10% to 80% by weight of the composition of a hydraulic binder, from 6% to 60% by weight of the hydraulic binder of a water soluble, dispersible or miscible polymer, and water in an amount sufficient to rehydrate the hydraulic binder; and (iii) encapsulating the core in an encapsulating layer of the composition and allowing the composition to harden to form the building component.

According to a third aspect of the invention there is provided a core for use in forming a building component as described above.

According to a fourth aspect of the invention there is provided a composition for use in encapsulating a core to form a building component as described above.

DESCRIPTION OF EMBODIMENTS

The crux of the invention is that a building component is formed from a core which itself is formed from one or more sheets or elements of a natural fibre material, each sheet or element having been impregnated with a liquid composition comprising a thermosetting resin, an extending liquid for the thermosetting resin and a catalyst for the thermosetting resin, the thermosetting resin been polymerized, and wherein the core is encapsulated in an encapsulating layer of a composition comprising a suitable amount of a hydraulic binder, a suitable amount of a water soluble, dispersible or miscible polymer, and water in an amount sufficient to rehydrate the hydraulic binder.

The core may take many forms.

The core may comprise a composite board comprising first and second sheets of a natural fibre material, each sheet having been impregnated with a liquid composition comprising a thermosetting resin, an extending liquid for the thermosetting resin and a catalyst for the thermosetting resin, the thermosetting resin having been polymerized, and one or more corrugated sheets of a natural fibre material, sandwiched between and adhered to the first and second sheets, with the corrugations either substantially at right angles to the plane of the first and second sheets or parallel to the plane of the first and second sheets, the one or more corrugated sheets having been impregnated with a liquid composition comprising a thermosetting resin, an extending liquid for the thermosetting resin and a catalyst for the thermosetting resin, the thermosetting resin having been polymerized.

The composite board may be made by impregnating the first and second sheets with a liquid composition and thereafter polymerizing the thermosetting resin, impregnating the one or more corrugated sheets with the liquid composition and thereafter polymerizing the thermosetting resin, and then adhering the one or more corrugated sheets optionally to each other and to the first and second sheets by gluing, preferably using the same thermosetting resin used for impregnation.

Alternatively, the composite board may be made by locating the one or more corrugated sheets between the first and second sheets, impregnating the assembled structure with the liquid composition and thereafter polymerizing the thermosetting resin to join the one or more corrugated sheets to each other and to the first and second sheets to form the composite board.

The first and second sheets of a natural fibre material may be sheets of kraft paper, bleached or unbleached paper pulp in sheet form, or single or double wall corrugated paperboard, and may comprise single sheets or may consist of a plurality of single sheets laminated together.

The core may also comprise a composite panel comprising first and second sheets of a natural fibre material, each sheet having been impregnated with a liquid composition comprising a thermosetting resin, an extending liquid for the thermosetting resin and a catalyst for the thermosetting resin, the thermosetting resin having been polymerized, and a cellular core of a natural fibre material sandwiched between and adhered to the first and second sheets, optionally with some or all of the cells of the cellular core containing a filler composition comprising a mixture of an inorganic insulating material and a material which releases water at elevated temperatures, in granular form.

The cellular core may be comprised of a natural fibre material which has been impregnated with the liquid composition, the thermosetting resin having been polymerized. Each cell of the cellular core may be of triangular, hexagonal, rectangular, square, circular or elliptical cross-section and the cellular core may be made of corrugated cardboard or kraft paper or a combination thereof, impregnated with a liquid composition as described above.

The cellular core is sandwiched between and adhered to the first and second sheets. The method of adhesion may be the use of a suitable glue.

The cells of the cellular core may be filled with a filler composition comprising a mixture of an inorganic insulating material such as exfoliated vermiculite, expanded perlite, mineral wool, expanded day and the like and a material which releases water at elevated temperatures, such as aluminium trihydrate, the alkali metal salts of silicates, unexfoliated vermiculite and the like.

A composite panel of this type is disclosed in South African Patent Application No 92/2902 to Plascon Technologies (Pty) Limited.

The core may also comprise a six sided box, for example made of corrugated cardboard, the whole having been impregnated with a liquid composition as described above, with the thermosetting resin having been polymerized. For example, the box, made of corrugated cardboard, can be manufactured in a conventional manner by first manufacturing a flat blank from corrugated cardboard, impregnating the flat blank with a liquid composition comprising a thermosetting resin, an extending liquid for the thermosetting resin and a catalyst for the thermosetting resin, assembling the blank to form the six sided box, recapturing the extending liquid for re-use and then polymerizing the thermosetting resin.

The impregnation of the sheets and elements of the core may be carried out using the method and using the liquid compositions disclosed in South African Patent No 90/2260 to Plascon Technologies (Pty) Limited.

The core may include a formation or formations along one or more of its edges to enable the building component made from the core to be releasably or permanently attached to a similar building component to form a structure.

For example, when the core comprises a six sided box, one or more of the sides may be shaped to form an interlocking formation, for example in the form of a V or a tongue on one side, with a corresponding groove on another side.

The core may be shaped and sized so as to give a building component which may be a building block or a building panel, measuring anything from 200 mm×75 mm×20 mm, up to 10 m in length, 2 to 3,5 m in height and 40 to 250 mm in thickness.

After formation, the core is encapsulated in an encapsulating layer of a composition, the components of which are set out below.

The first component of the composition is from 10% to 80% inclusive by weight of the composition of a hydraulic binder which may be selected from Portland cement, a high alumina cement, calcium sulphate anhydride, calcium sulphate hemihydrate, magnesium oxychloride and magnesium oxysulphate. The preferred hydraulic binders are Portland cement and the alpha and beta hemihydrates of calcium sulphate, or a blend of these. The hydraulic binder comprises from 10 to 80% by weight of the composition, more usually from 15 to 65% by weight of the composition in the case of Portland cement and high alumina cement and from 20% to 80% by weight of the composition in the case of calcium sulphate and the other hydraulic binders.

The second component of the composition is from 6% to 60% by weight of the hydraulic binder of a water soluble, dispersible or miscible polymer which is designed to promote resistance to water, to provide toughness and adhesion. The polymer is preferably stable to electrolytes and has a film-forming temperature of between −15° C. and +40° C., particularly between 0° and 25° C. The polymer may be polyvinyl alcohol or may be based on polyurethane, olefin, (meth)acrylate vinyl ester, polyvinyl halide or chloroprene co-polymers. Particularly suitable polymers are dispersions of styrene-butadiene-rubber, polyurethane, butadiene vinylacetateco-polymers and polyacrylic acid esters, which are stable to electrolytes. These dispersions are preferably added to the water. An example of a particularly suitable acrylic polymer dispersion is Revertex 6115A. The polymer is present in an amount of from from 6% to 60% by weight of the hydraulic binder, preferably in an amount from 8% to 45% by weight of the hydraulic binder, at a solids percentage in water of the order of 50%.

The third component of the composition is water in an amount sufficient to hydrate the hydraulic binder, but preferably not in excess of this level, to avoid microporosity of the set composition. The amount of water added, in addition to that present in the second component, is typically in the range of from 5% to 50%, more preferably from 8% to 45% by weight of the hydraulic binder.

The fourth optional component of the composition is an inorganic extender for the hydraulic binder, typically a silica sand having a particle size of 0,03 to 4 mm, more typically of from 0,3 mm to 0, 75 mm, added in an amount of from 0% to 400%, preferably in an amount of 0% to 350% by weight of the hydraulic binder.

The fifth optional component of the composition is a waterproofing agent designed to render the composition as hydrophobic as possible, preferably zinc stearate, added in an amount of from 0,1% to 5%, preferably in an amount of from 0,3% to 2% by weight of the hydraulic binder.

Other waterproofing agents include silicone such as an anhydrous silicone based on hydrogen polysiloxane, BS94, by Wacker, or a solution of potassium methyl siliconate which reacts with atmospheric carbon dioxide to produce polymethyl silicic acid, such as BS15 by Wacker, added in an amount of from 0,05% to 3% by weight of the hydraulic binder.

The sixth optional component of the composition is an anti-foam agent added typically in an amount of from 0,01% to 3% by weight of the hydraulic binder, for example Nopco NDW by Marine Oil, South Africa, or Byk 141 by Byk Chemic, Germany.

The seventh optional component of the composition is a suitable amount, for example from 0,02% to 4% by weight of the hydraulic binder, of a dispersant to avoid phase separation and to minimise water demand, for example Dispex by Allied Colloids Ltd, UK.

The eighth optional component of the composition is a plasticiser adapted to reduce water demand, to reduce the viscosity of the composition and to prevent phase separation as well as to contribute to mechanical properties, for example a melamine formaldehyde condensate such as F10 by Hoechst, added in an amount of from 0,05% to 3% by weight of the hydraulic binder.

The ninth optional component of the composition is rheological controller such as a microfibre, typically a silica fibre sold under the tradename Aerosil or a silica fume of small particle size such as 0,1 micron and of a hollow microsperical particle shape, added in an amount of from 1% to 15%, more preferably in an amount of from 3% to 10% by weight of the hydraulic binder.

The tenth optional component of the composition is an accelerator for the hydration of Portland cement, when Portland cement is used as the hydraulic binder, such as 1% to 5% by weight of the hydraulic binder of calcium chloride or a small quantity of a high alumina cement.

The eleventh optional component of the composition is an amount of a reinforcing fibre such as nylon, acrylic, polyester or cellulose fibre, or a polyacrylic nitrile fibre such as Dolanit by Hoechst, with a fibre length range of 0,2 mm to 6 mm, more typically in the range of 1,5 mm to 3 mm, which is added for the promotion of toughness, to prevent cracking on impact or when subjected to elevated temperatures. The reinforcing fibre may be added in an amount of from 1% to 20%, more preferably in an amount of from 3% to 10% by weight of the hydraulic binder.

The twelfth optional component of the composition is an amount of expanded perlite or exfoliated vermiculite of fine particle size in the range of from 0,05 mm to 3 mm, optionally treated with a hydrophobic agent such as a silicone or siloxane to prevent excessive water uptake, and which is included to reduce the weight of the composition.

The composition may be sprayed onto, trowelled onto or otherwise applied to the core, suitably smoothed or textured, and then allowed to harden or set by hydration and the coalescence of the polymer included in the composition.

The encapsulating layer preferably has a thickness of from 1 mm to 20 mm, more preferably from 2 mm to 8 mm.

Subsequent to the hardening or setting of the composition, the building component may be painted or otherwise decorated, as desired.

The impregnation of the core with the liquid composition as described above provides the core with adequate mechanical properties such as resistance to warping, wet strength, resistance to water permeability, impact strength and stiffness so that when the core is encapsulated by the composition, no distortion occurs and the core in itself already has the structural integrity necessary for a building component. The core may also provide other advantages such as thermal insulation, fire resistance, acoustic absorption and lightness and ease of handling of the final building component.

The composition which encapsulates the core provides the building component with improved strength, impact resistance, resistance to fire, resistance to water permeability, provides a surface texture when required, provides a jointing facility and a water dripway.

An example of the manufacture of a building component of the invention will now be given:

1. A six sided corrugated cardboard box or container is made up suitably creased, die cut and stapled or glued such that the top flap when assembled is formed outwards to provide a tongue, the bottom flap conversely is formed inwards to provide a groove and similarly the side walls are creased and formed to form a tongue and a groove respectively. The corrugated cardboard carton in the flat condition is made up in such a way that the flutes of the corrugated board are all unidirectional and are not closed by wrapovers so that on subsequent impregnation resin drainage is easily achieved.

2. The corrugated cardboard blank in the flat condition is immersed in a liquid composition comprising a thermosetting resin, an extending liquid for the thermosetting resin and a catalyst for the thermosetting resin for from between 15 seconds and five minutes, preferably for a period of two to three minutes until thorough impregnation is achieved.

3. The corrugated cardboard blank in the flat condition is removed from the impregnating composition, excess resin is allowed to drain back into the resin receptacle and the extending liquids are recovered for re-use.

4. The corrugated cardboard carton is assembled with top and bottom flaps engaged.

5. The assembled corrugated cardboard carton is subjected to temperature increase to between 40° C. and 140° C., more usually in the range 60° C. to 90° C., for a period typically of up to four hours, at low to zero relative humidity, to polymerize the thermosetting resin.

6. The rigid strengthened carton is allowed to cool down and is placed in a suitable holder ready for encapsulation.

7. The dry components of the encapsulating composition are mixed with the liquid components and the mixture is sprayed, trowelled or otherwise applied to the carton to a uniform thickness, typically of from 1 mm to 20 mm, more usually in the range of from 2 mm to 8 mm in thickness and the surface either smoothed or textured as required and allowed to set.

8. The building component may then be decorated ready for despatch.

Examples of the encapsulating composition will now be given:

| Composition 1 | |
|---|---|
| Grey Portland cement | 9 kg |
| Silica sand of 0,3 to 0,75 mm particle size | 27 kg |
| Zinc stearate | 50 gram |
| Polymer dispersion in water, Code Revacryl 6115A by Revertex | 3 kg |
| Water | 3 kg |
| Anti foam agent | 14 gram |
| Dispersant | 14 gram |
| Plasticiser-(Melamine formaldehyde condensate F10 by Hoechst) | 135 gram |
| Cellulose fibre 3 mm fibre length (Interfibre by Union Carbide) | 600 gram |
| Silica fume | 500 gram |
| Composition 2 | |
| The alpha hemihydrate of calcium sulphate | 8 kg |
| Plasticiser-(Melamine formaldehyde condensate F10 Melment by Hoechst) | 60 gram |
| Phenol formaldehyde resole resin 17390 by Norsophen | 1,6 kg |
| Acid (toluene sulphonic acid) | 120 gram |
| Polyvinyl alcohol 5% solution in water, code 4/88 Mowiol by Hoechst | 1,6 kg |
| Cellulose fibre, mean 3 mm fibre length (Interfibre by Union Carbide) | 500 gram |

The building component of the invention has many desirable attributes including good impact resistance, water impermeability, a high strength to weight ratio and is easily and rapidly manufactured.

I claim:

1. A building component comprising a core formed from a natural fibre material, said fibre material having been impregnated with a liquid composition comprising a thermosetting resin, an extending liquid for the thermosetting resin and a catalyst for the thermosetting resin, the thermosetting resin having been polymerized, and an encapsulating layer encapsulating the core, the encapsulating layer being formed from a composition comprising from 10% to 80% by weight of the composition of a hydraulic binder, from 6% to 60% by weight of the hydraulic binder of a polymer selected from the group consisting of a water soluble polymer, a water dispersible polymer, and a water miscible polymer, and water to rehydrate the hydraulic binder, the composition having hardened to form the encapsulating layer.

2. A building component according to claim 1 wherein the core includes a formation along one of its edges to enable the building component made from the core to be releasably or permanently attached to another similar building component to form a structure.

3. A building component according to claim 1 wherein the hydraulic binder is selected from the group consisting of Portland cement, a high alumina cement, calcium sulphate anhydride, calcium sulphate hemihydrate, magnesium oxychloride and magnesium oxysulphate.

4. A building component according to claim 3 wherein the hydraulic binder is selected from the group consisting of Portland cement and a high alumina cement and comprises from 15% to 65% by weight of the composition.

5. A building component according to claim 1 wherein the polymer is present in an amount of from 8% to 45% by weight of the hydraulic binder at a solids percentage in water of the order 50%.

6. A building component according to claim 1 wherein the composition includes an inorganic extender in an amount of from 0% to 400% by weight of the hydraulic binder.

7. A building component according to claim 1 wherein the composition includes a waterproofing agent in an amount of from 0,1% to 5% by weight of the hydraulic binder.

8. A building component according to claim 1 wherein the composition includes an antifoam agent in an amount of from 0,01% to 3% by weight of the hydraulic binder.

9. A building component according to claim 1 wherein the composition includes a dispersant in an amount of from 0,02% to 4% by weight of the hydraulic binder.

10. A building component according to claim 1 wherein the composition includes a plasticiser in an amount of from 0,05% to 3% by weight of the hydraulic binder.

11. A building component according to claim 1 wherein the composition includes a rheological controller in an amount of from 1% to 15% by weight of the hydraulic binder.

12. A building component according to claim 1 wherein the composition includes a reinforcing fibre in an amount of from 1% to 20% by weight of the hydraulic binder.

13. A building component according to claim 1 wherein the composition includes expanded perlite or exfoliated vermiculite, optionally treated with a hydrophobic agent.

14. A building component according to claim 1 wherein the encapsulating layer has a thickness of from 1 mm to 20 mm.

* * * * *